Jan. 22, 1963 V. V. MARCHI 3,074,596
PUMPING METHOD AND APPARATUS
Filed Nov. 7, 1958 3 Sheets-Sheet 1

INVENTOR.
VITO V. MARCHI
BY
SMITH, WILSON, LEWIS & McRAE

Jan. 22, 1963 V. V. MARCHI 3,074,596
PUMPING METHOD AND APPARATUS
Filed Nov. 7, 1958 3 Sheets-Sheet 2

INVENTOR.
VITO V. MARCHI
BY
SMITH, WILSON,
LEWIS & McRAE

Jan. 22, 1963 V. V. MARCHI 3,074,596
PUMPING METHOD AND APPARATUS
Filed Nov. 7, 1958 3 Sheets-Sheet 3

INVENTOR.
VITO V. MARCHI
BY
SMITH, WILSON, LEWIS & McRAE

United States Patent Office 3,074,596
Patented Jan. 22, 1963

3,074,596
PUMPING METHOD AND APPARATUS
Vito V. Marchi, Redwood City, Calif., assignor to American Radiator & Standard Sanitary Corporation, New York, N.Y., a corporation of Delaware
Filed Nov. 7, 1958, Ser. No. 772,503
12 Claims. (Cl. 222—1)

This invention relates to a method and apparatus for pumping predetermined quantities of liquid by means of thermal expansion of a contained fluid body. The invention has particular application in the dispensing of wash additives and rinse additives into the tub of an automatic domestic washing machine, as for example, a clothes washing machine or dishwashing machine.

One object of the invention is to provide a method and apparatus of the above-identified character, wherein the pumping operation can be easily controlled by a simple device, as for example, a single switch.

Another object of the invention is to provide a method and apparatus of the above-identified character, wherein component parts of the apparatus may be disposed in locations remote from one another, whereby to facilitate installation of the apparatus in various different makes and models of washing machines.

Another object of the invention is to provide an apparatus of the above-identified character wherein the volume of dispensed additive may be accurately controlled and adjusted.

Another object is to provide a dispensing apparatus utilizing a dispensed volume adjustment control mechanism which is of simple construction and which is actuable over its range by a small distance movement, whereby to enable use of a simple manually actuable device and force transmission mechanism for remote operation purposes.

Another object is to provide a method and apparatus for dispensing predetermined quantities of material by the application of heat, the apparatus being particularly designed so that inadvertent input of excessive quantities of heat is ineffective to cause damage to component parts of the mechanism.

Another object is to provide an apparauts of the above-identified character which is of "fail-safe" construction.

Another object is to provide an electrically powered dispensing apparatus of such design as to be capable of discharging a relatively large volume of material with a relatively low current consumption, thereby promoting long contact life of the switch mechanism used to control the dispensing operation.

Another object of the invention is to provide a method and apparatus for dispensing corrosive materials such as wash additives, wherein air or other non-corrosive medium is used as a pumping mechanism so as to avoid the valving of the corrosive materials, it being appreciated that valves for corrosive materials must be constructed of high-cost non-corrosive metals.

Another object is to provide a method and apparatus of the above-identified character, wherein a minimum number of moving parts are required, thereby promoting a long service life.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangment of parts illustrated in the accompanying drawings, since the invention is capable of other embodiments and of being practiced or carried out in various ways. Also, it is to be understood that the phraseology or terminology employed herein is for the purpose of description and not of limitation.

Figure 2:
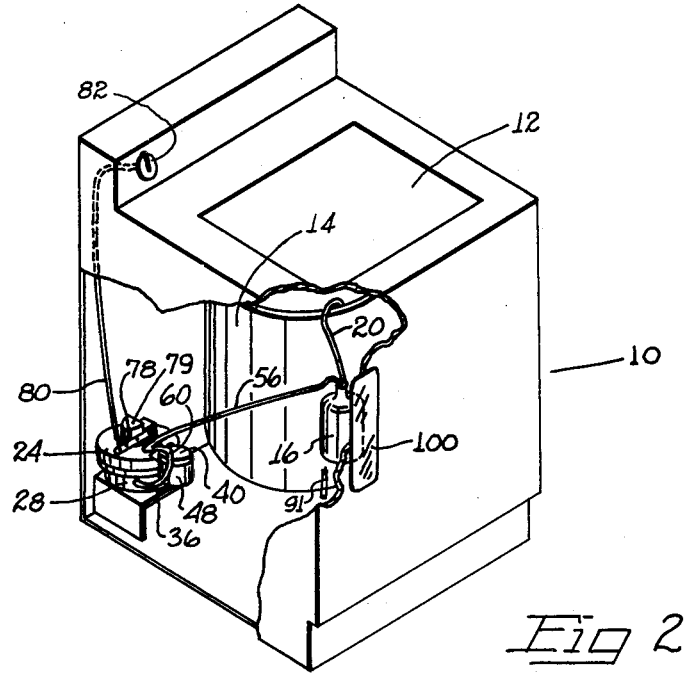
FIG. 2 is a perspective view showing the FIG. 1 apparatus in association with other mechanisms forming one embodiment of the invention.
Figure 3:
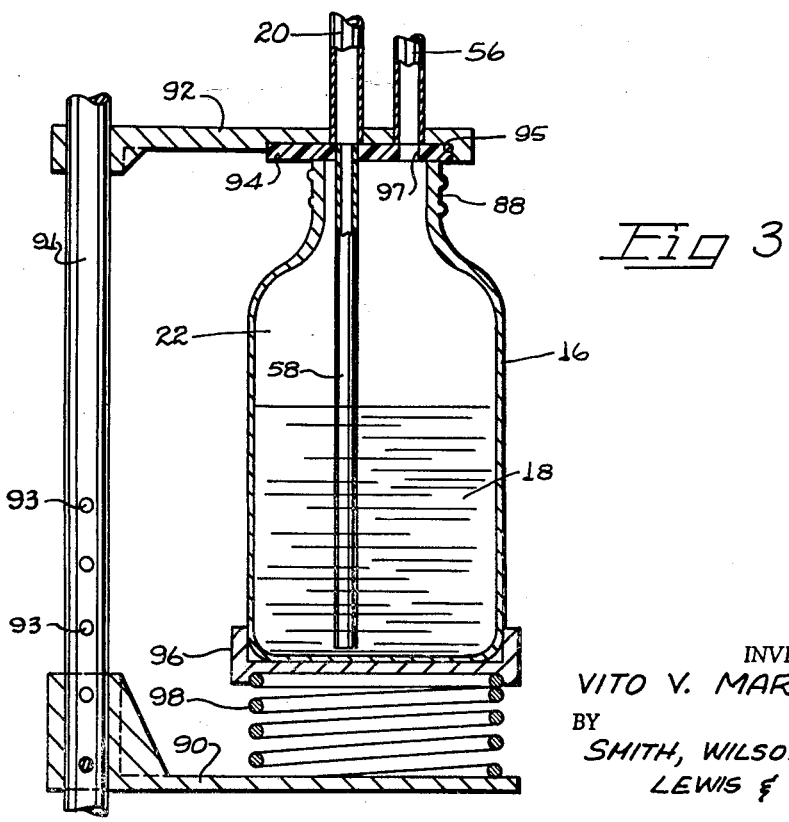
FIG. 3 is a sectional view through a dispensing container employed in the FIG. 2 embodiment.

In the drawings there is shown a conventional clothes washing machine 10 having a tub access closure 12 overlying a clothes washing machine tub 14. The washing machine of FIG. 2 is equipped with a dispenser 16 adapted to contain conventional wash or rinse additives 18 (FIG. 3). A flexible conduit 20 extends from dispenser 16 into a position for discharging into tub 14. In operation, when the air pressure in the space 22 above liquid 18 in dispenser 16 is greater than atmospheric a quantity of liquid 18 will be forced from the dispenser through tube 20 into washing machine tub 14.

Figure 1:
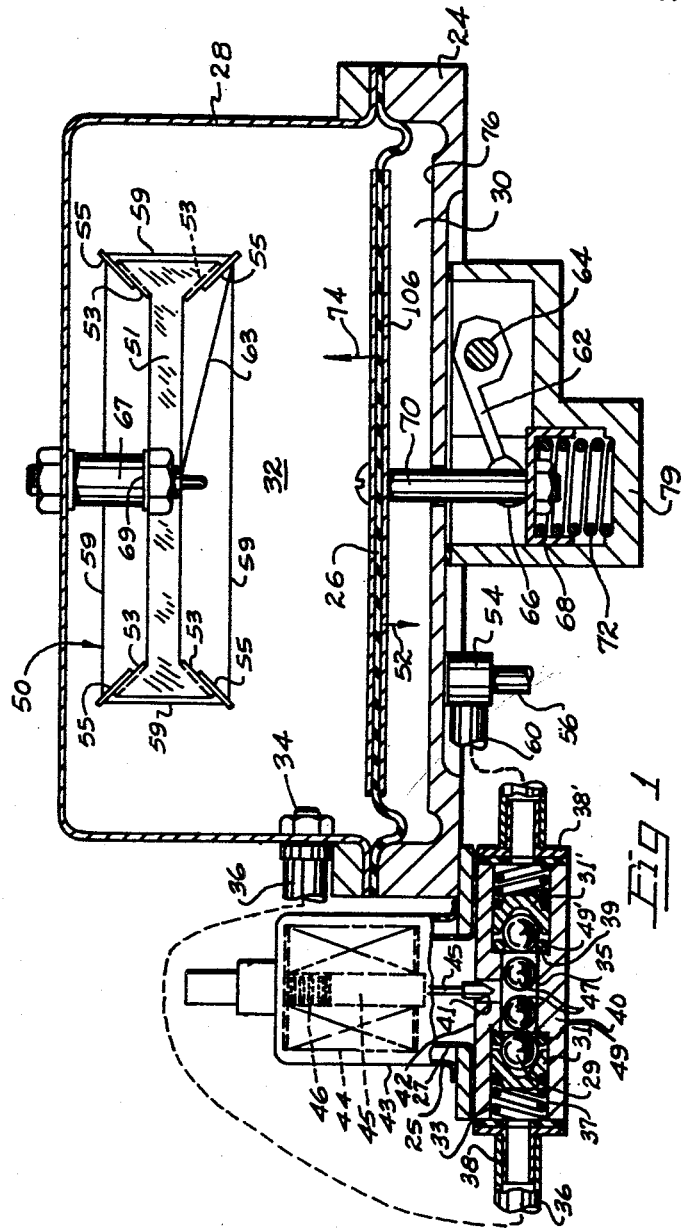
FIGURE 1 is a cross-sectional view through a casing structure and valve mechanism forming a portion of one embodiment of the invention.

In order to change the pressure in space 22 there is provided the mechanism shown in FIG. 1. The FIG. 1 mechanism includes a casing member 24 closed by a diaphragm 26. A second casing member 28 overlies diaphragm 26, the arrangement of the two casing members and diaphragm serving to define two chambers 30 and 32 of inversely varying volume (i.e., when the diaphragm moves in the arrow 74 direction the chamber 30 volume is increased and the chamber 32 volume is decreased, and conversely, when the diaphragm moves in the arrow 52 direction the chamber 32 volume is increased and the chamber 30 volume is decreased).

Casing member 28 is provided with a vent fitting 34 which mounts a flexible tube 36. The other end of tube 36 is connected with a fitting 38 carried on a valve housing 40. Housing 40 is provided with a central opening 41 in its face 42, said face serving to mount solenoid structure 43 having a coil 44 surrounding an armature plunger 45. A compression spring 46 urges plunger 45 from its illustrated position toward a position engaged with cam elements 47 when coil 44 is de-energized. Energization of coil 44 returns the armature plunger to its illustrated position.

In the illustrated position of plunger 45, tube 36 and chamber 32 are sealed from the ambient atmosphere by an O-ring sealing element 49 which seals against an annular shoulder 39 defined by the intersection of bores 37 and 35 formed in housing 40. The sealing pressure is established by a compression spring 33 acting on a slidable guide element 31, said guide element serving to cradle a spherical element 29 which pressures against the O-ring to force it into tight sealed engagement against shoulder 39.

In its natural condition O-ring 49 is of slightly smaller major diameter than the diameter of bore 37. Thus, when plunger 41 is moved by coil 44 into camming engagement with elements 47, the resultant movement of spherical element 29 is effective to allow the O-ring to contract slightly so as to allow passage of air around its periphery. Elements 31, 41 and 47 are suitably constructed to permit passage of air therepast, as by forming openings therein or constructing the elements of such dimensions as to provide clearance spaces with the surfaces defined by the various bores. Also air vent openings are provided at 27 and 25.

It will be appreciated from the above description that when coil 44 is energized chamber 32 is sealed from the atmosphere, and when coil 44 is de-energized chamber 32 is vented to atmosphere. In operation, during the period when chamber 32 is sealed an electrical resistance heater 50 is energized to heat the trapped air in chamber 32 so as to expand said trapped air for forcing diaphragm 26 in the arrow 52 direction.

Figure 6:
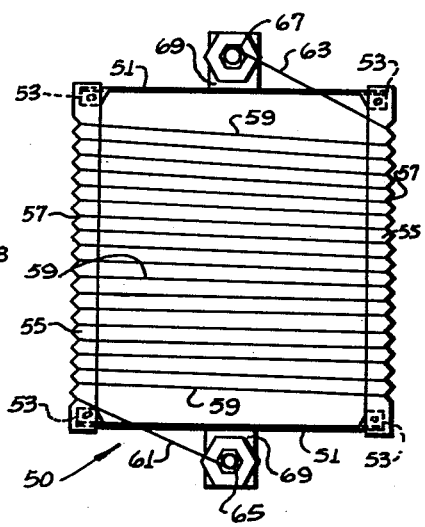
FIG. 6 is a plan view of a heater structure utilized in the FIG. 1 mechanism.

Heater 50 preferably comprises a pair of end plates 51, each having four angularly turned flanges 53 which fixedly engage mica strips 55. As can be seen from FIG. 6 each of the mica strips is provided with a series of notches 57 along its length to receive resistance wire 59, said wire being wrapped around the strips and having its end portions 61 and 63 connected to insulate terminals 65 and 67 carried on turned out portions 69 of the end plates 51. The terminals extend through openings in casing member 28 to receive leads (not shown) for energization of the heater.

It will be noted that the heater wires 55 are located centrally within chamber 32 (as opposed to being located on an exterior wall). Also the heater wires are entirely surrounded by the chamber 32 air (without being embedded in their support structures), and the mass of the support structures 51 and 55 is very low so as to extract very little heat during heater energization. These factors insure a rapid heating of the chamber 32 air with a fairly low heater temperature. The low heater temperature is of importance because of the low wattage required and the freedom from dangerous pressure conditions in the event of inadvertent heater energization over a prolonged time period.

As previously indicated, when electrical resistance heater 50 is energized to heat the air in chamber 32 the gas pressure in chamber 32 is caused to appreciably increase so as to force diaphragm 26 to move in the arrow 52 direction. This action causes chamber 30 to decrease in volume so as to force the gas in chamber 30 through a fitting 54 into a flexible conduit 56. The other end of conduit 56 communicates with the interior of dispenser 16 (FIG. 3); consequently, the gas which is forced from chamber 30 is caused to flow into the space 22 above liquid 18 so as to develop a pumping pressure thereon effective to force liquid upwardly through tube 58 and into the washing machine tub 14 via the conduit 20.

It will be noted that fitting 54 mounts one end of a flexible tube 60 which extends over to fitting 38' as shown in FIG. 1. Suitable valve structure (similar to that formed by elements 47, 49, 29 and 31) is provided for putting tube 60 in communication with the ambient atmosphere when solenoid coil 44 is de-energized. The operation is such that when valve elements 49 and 49' are opened by spring 46 the pressure in space 22 and chamber 30 and 32 is atmospheric. When valve elements 49 and 49' are closed by solenoid 44, dispenser space 22 and chambers 30 and 32 are sealed from the atmosphere, and the pressures in these chambers are determined by the condition of heater 50. As previously explained, when heater 50 is energized diaphragm 26 is moved in the arrow 52 direction to develop an increased dispenser pumping pressure in space 22.

It is desirable in some installations to adjust and control the quantity of material 18 dispensed from dispenser 16, and accordingly there is provided an adjustable stop mechanism including a lever 62 pivoted on a shaft 64. Lever 62 is provided with an enlarged end portion 66 which engages against a piston 68 carried by rod 70. A compression spring 72 urges piston 68 (and the connected diaphragm 26) in the arrow 74 direction. It will thus be seen that the rotated position of lever 62 is effective to control the initial position of diaphragm 26 (i.e., prior to energization of heater 50). Adjustment of lever 62 in a clockwise direction from its FIG. 1 position will cause diaphragm 26 to take a position wherein the initial volume of chamber 30 is comparatively large, and adjustment of lever 62 in a counterclockwise direction will cause diaphragm 26 to take a position wherein the volume of chamber 30 is relatively small. Diaphragm 26 is provided with a pressure plate 106 which bottoms on surface 76 during the application of heat from heater 50. Thus, during the period when heat is applied by heater 50 the volume of chamber 30 will be reduced in an amount corresponding to the travel of plate 106, and since the initial position of plate 106 is controlled by the adjusted rotated position of lever 62, said lever serves as a control device for determining the amount of chamber 32 volumetric increase experienced during each heating cycle. As previously indicated, the volumetric expansion of chamber 32 determines the quantity of liquid 18 pumped into the washing machine tub.

In the illustrated embodiment the adjusted position of lever 62 may be easily controlled by means of an external lever 78 (FIG. 2) connected to a portion of shaft 64 located outside of casing 79. Lever 78 is connected to a flexible cable 80 which extends upwardly to a manually rotatable lever carried on the pivot of a maually rotatable selector element 82 (FIG. 2). Element 82 is positioned on a dial structure having suitable indicia corresponding to volumes of additive required for various additive uses.

In operation of the illustrated apparatus, volume selector lever 82 is adjusted to a position dictated in accordance with the quantity of additive required for a particular operation. This quantity of additive may be varied in accordance with different factors, such as the type of additive (wash additive, water softener, rinse additive, anti-spotting additive, etc.) or the character of material being washed in tub 14 (as for example, white and colorfast articles, non-colorfast articles, synthetic materials, woolens, silks, etc.).

At a predetermined time in the wash-rinse cycle (as controlled by the conventional programming timing mechanism) solenoid 44 and heater 50 are energized. Energization of solenoid 44 closes valve elements 49 and 49' so as to trap air at atmospheric pressure in chambers 30, 32 and 22. Energization of heater 50 is thereupon effective to heat the gas in chamber 32 so as to force diaphragm 26 in the arrow 52 direction for a distance determined by the initial position of lever 62. Movement of diaphragm 26 in the arrow 52 direction is effective to displace gas from chamber 30 through tube 56 and into dispenser reservoir chamber 22 so as to develop a pumping pressure on the liquid 18. A predetermined quantity of liquid is thereby forced upwardly through tube 58 and subsequently into the washing machine tub 14 via conduit 20. The amount of liquid dispensed through conduit 20 is proportional to the movement of diaphragm 26.

After the dispensing operation is completed it is necessary to return diaphragm 26 to its initial position for a subsequent dispensing operation. Return of diaphragm 26 is automatically effected by opening valve elements 49 and 49' (i.e., by de-energization of solenoid 44). When elements 49 and 49' are open the high pressure gas in chamber 32 is automatically vented through tube 36 so as to allow spring 72 to act on piston 68 for driving said piston and diaphragm 26 in the arrow 74 direction until the piston contacts lever 62; at this time any superatmospheric pressure conditions in chambers 30 and 22 are automatically relieved through the conduit 60. In this manner the apparatus is reset for a subsequent dispensing operation.

It will be noted from FIG. 3 that dispensing container 16 is constructed as a conventional bottle having a threaded neck portion 88 adapted for reception of a conventional closure cap (not shown). Thus the dispensing bottle with its cap can be sold and positioned in its support structure by the user without requiring the user to pour the bottle contents into a separate storage reservoir. In this manner the danger of spilling the additive is minimized. The support structure for the dispensing bottle includes at platform 90 which may be supported for vertical adjusting movements on a fixed standard 91 by a conventional manually operated spring-urged latch mechanism (not shown). The standard may be provided with a series of openings 93 for reception of the latch mechanism. Fixedly positioned on standard 91 is a lid structure having a non-symmetric recess 95 for releasable reception of a non-symmetrical rubber sealing element 94. The sealing element is provided with an opening 97 and tubular stem 58 which register with respective ones of tubes 56 and 20 when the sealing element is correctly seated in recess 95. The non-symmetrical character of recess 95 and element 94 insures that the various passages at 20, 58, 56 and 97 will be correctly aligned.

To insert the dispenser bottle into its support structure, the user places the seal 94-stem 58 assembly into the bottle and merely moves the bottle downward and inward until seal 94 slips into place against structure 92. The spring 98 serves to maintain the neck of bottle 16 tightly engaged against sealing disc 94 and disc 94 tightly against structure 92 so as to provide an airtight seal. The aforementioned vertical adjustment of platform 90 allows the apparatus to accommodate bottles of differing height for adapting the device to different brand additives and bottle sizes. Insertion and removal of the bottle into the washing machine takes place through a small access door 100 (FIG. 2), which may be partially or wholly transparent to permit visual ascertainment as to when the bottle needs replacement.

Figure 5:
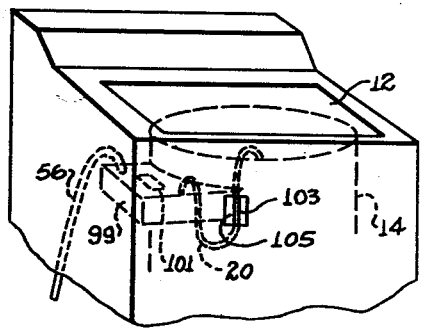
FIG. 5 is a view showing a washing machine equipped with an additive reservoir employable as an alternate to the reservoir 16 shown in FIG. 2.

If desired the additive reservoir may be constructed as a closed tank structure 99 as shown in FIG. 5. A suitable access door 101 may be provided in the tank top wall for filling purposes, and a section 103 of the discharge line 20 horizontally aligned with the tank may be made transparent for quick ascertainment of the liquid level in the tank. Section 105 of the washing machine is made transparent to permit viewing of section 103.

Figure 7:
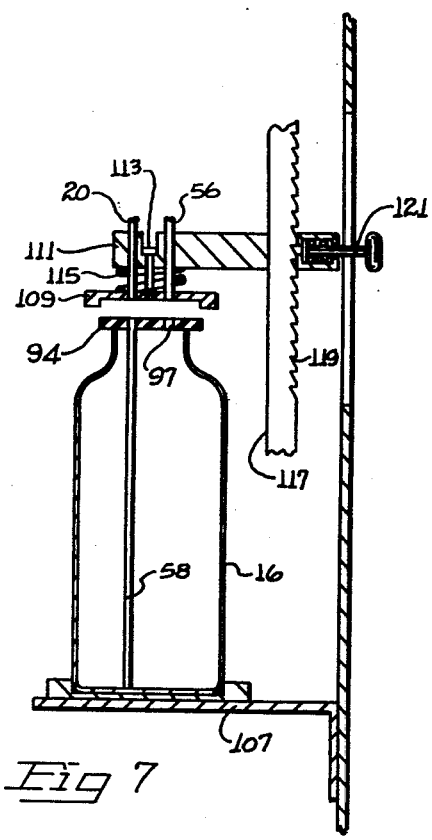
FIG. 7 is a view illustrating an additive reservoir support structure which may be employed as an alternate to the support structure shown in FIG. 3.

An alternate to the FIG. 3 bottle-mounting structure is shown in FIG. 7. In the FIG. 7 embodiment there is provided a fixed platform 107 and an overlying lid structure 109 floatably suspended from arm structure 111 by means of one or more headed pins 113. A compression spring 115 is provided for normally urging lid structure 109 into tight sealing engagement with sealing disc 94 when arm structure 111 has been adjusted vertically downward from its illustrated position. Arm structure 111 is slidably carried on a vertical standard 117 which is provided with a series of notches 119 registering with a spring-urged latch pin 121. Manual withdrawal of the latch pin permits upward adjustment of arm structure 111, downward adjustment of arm structure 111 taking place automatically with the application of a manual downward force thereon. It will be seen that the FIG. 7 structure has the same advantages as the FIG. 3 structure.

Figure 4:
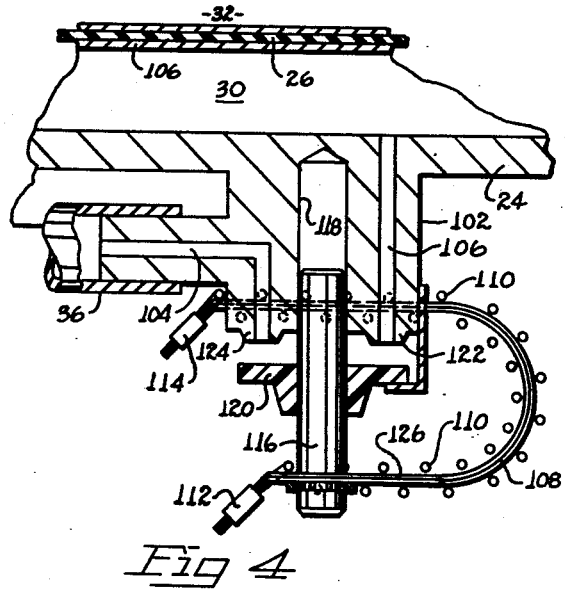
FIG. 4 is a sectional view through a valve mechanism which may be employed interchangeably with a valve mechanism shown in the FIG. 1 structure.

In FIG. 4 there is shown a vent valve structure which can be employed in place of the solenoid-controlled vent structure of FIG. 1. The FIG. 4 construction includes a valve body 102 which may be formed integrally with or separately from casing member 24. Valve body 102 is bored out to provide vent passages 104 and 106 which put tube 36 and chamber 30 in communication with the ambient atmosphere. Flow through these vent passages is controlled by a U-shaped bimetal 108, about which is wrapped a resistance heater 110 having leads 112 and 114. If desired the heater can be a "painted on" structure.

One end portion of bimetal 108 is fixedly engaged with a portion of valve body 102, and the other bimetal end portion is secured on a pin 116 slidably extended from bore 118 in body 102. An intermediate portion of pin 116 fixedly mounts a plastic valve disc 120 which registers with the annular valve seats 122 and 124. The formation of bimetal 108 is such that energization of its heater 110 causes leg 126 of the bimetal to flex toward valve body 102 so as to cause disc 120 to close passages 104 and 106. This action corresponds to the action of the FIG. 1 vent structure wherein energization of solenoid coil 44 seals tubes 36 and 60 from the ambient atmosphere.

In the FIG. 4 structure, de-energization of heater 110 is effective to cool the bimetal to allow the leg 126 to draw disc 120 away from seats 122 and 124. In this manner chambers 32 and 30 are vented to the atmosphere. It will be noted that FIG. 4 does not show any tube corresponding to tube 56. In practice such a tube is employed in the FIG. 4 structure but the tube connects with a portion of chamber 30 not visible in FIG. 4. The venting action is of course the same whether tube 56 connects directly with tube 60 as in the FIG. 1 embodiment or directly with a remote portion of chamber 30 as in the FIG. 4 embodiment, it being noted that in either case the tube 60, chamber 30, and tube 56 are in continuous fluid communication with one another.

It will be understood that the FIG. 4 construction is adapted for interchangeable use with the vent structure shown in FIG. 1. Thus, bimetal 108 serves the same function as element 41, namely to trap gas within chambers 30, 32 and 22 in the closed position, and to vent gas from said chambers in the open position.

It will be seen that the illustrated apparatus is of fairly simple construction with very few moving parts; as a result the apparatus is adapted to have a long service life without parts malfunctioning. It will also be noted that the liquid 18 is discharged from bottle 16 directly into the washing machine tub 14, without any intervening valve mechanisms. In many cases liquid 18 is of a corrosive nature, and the utilization of a valve mechanism between the liquid supply reservoir and the washing machine tub would necessitate making the valve mechanism of high-cost non-corrosive material. With the present construction such an expedient is entirely avoided.

It will also be noted that the electrical control mechanism (for the solenoid and resistance heater 50) can be easily constructed to draw very low current. This small current draw enables the control switch contacts to have long service life.

Referring to FIG. 2, it will be seen that the apparatus is of such design that its different component parts can be located in different positions within the washing machine. Thus the manual control component 82 can be located adjacent the upper rear portion of the machine, the pressure developing mechanisms within casings 24 and 28 can be located in a lower portion of the machine, and the dispensing container can be located adjacent the front portion of the machine. Various other locations can also be selected for housing these different component mechanisms. As a result of this feature the apparatus can be installed in various different machines without parts redesign.

The mechanism is also advantageous in that it enables use of a low-cost cable mechanism 80 for transmitting rotary adjustment of selector element 82 to the metering volume adjustment structure 62. In this connection it will be noted that no distance-multiplying devices are required between selector 82 and cable 80 or between cable 80 and lever 62. Lever 62 is capable of only a limited angular motion, but this small angular motion is sufficient for adjustment purposes because of the construction of the mechanisms 24 and 28. Thus, it will be seen that the chambers 30 and 32 are of considerable volume so that during operation of heater 50 a considerable displacement of gas is effected from a relatively small linear movement of the diaphragm 26.

Reference has heretofore been made to the "fail-safe" character of the apparatus. The "fail-safe" operation is made possible by the design wherein thermal energy is applied to the gas within chamber 32 by means of heater 50. The heater is a low-power unit which is sufficiently fast acting for satisfactory operation in the illustrated construction. However, if for any reason the heater switch should fail to de-energize the heater circuit, the design of the apparatus is such that the increased gas pressures in chamber 32 will not cause damage to the mechanism. In actual operation, excessively long energization of heater 50 causes heat to be lost to the ambient atmosphere. This lost heat balances the heat within chamber 32 so as to provide a ceiling on the chamber 32 temperature. There is thus provided a "fail-safe" construction which operates without parts damage in the event of inadvertent heater energization.

I claim:

1. The combination comprising a pair of opposed casing members defining an interface therebetween; a diaphragm at said interface for cooperating with the casing members in defining two chambers of inversely varying volume; heating means located in one of said chambers for heating the fluid to cause expansion thereof for moving the diaphragm in one direction; spring means opposing said one direction movement; and adjustable stop means operatively connected with said diaphragm and arranged to limit movement of the diaphragm in the opposite direction so as to determine the diaphragm position prior to application of heat to the fluid in said one chamber.

2. The combination comprising a housing structure, and a diaphragm therewithin defining a pair of variable volume air chambers; a spring support element extending from the diaphragm; a spring acting on said spring support element to force the diaphragm in a direction to contract the volume of one of the chambers; a manually movable member engaged with said spring support element externally of the casing structure and opposing the action of said spring to thereby determine the initial position of the diaphragm; a vent opening for said one chamber; a second vent opening for the other chamber; a closed liquid container remote from said casing structure; conduit means interconnecting said liquid container and said other chamber; electrically-operated valve means for closing both of said vent openings; and electrically energizable heater means located in said one chamber for applying heat to the fluid in said one chamber.

3. The combination comprising a washing machine casing having a tub therein; a multi-chamber casing structure within said casing; said multi-chamber casing structure having a movable wall therein forming two chambers; a pair of opposed members in said washing machine casing; an open-mouthed additive dispenser releasably positioned between said members with its mouth portion sealed against one of said members; resilient means urging the two members toward one another to maintain the seal; a conduit discharging from the dispenser into the tub; a second conduit from one chamber of the multi-chamber casing structure into the dispenser; and heating means located in another chamber in the multi-chamber casing structure to contract said one chamber and pump fluid therefrom into the dispenser through said second conduit.

4. The method of dispensing a desired volume of liquid from a body of such liquid confined in a container, characterized by confining a body of gas in a chamber having a movable wall dividing the chamber into two volume compartments of inversely proportional capacity, locating heating means in one of the compartments, thermally expanding the confined body of gas in said one compartment by said heating means to a predetermined volume, the thermal expansion of said one body of gas reducing the capacity of the other compartment, and injecting into the liquid container a volume of gas from said other compartment proportionate to the volume increase in the confined body of gas in said one compartment to displace the desired volume of liquid from the container.

5. The method of dispensing a desired volume of liquid from a body of such liquid confined in a container, characterized by confining a body of air in a chamber of fixed volume, providing a movable wall in said chamber dividing the body of air into first and second bodies of air in air pressure relationship, locating heating means in said first body of air, thermally expanding the air in said first volume by said heating means, injecting into the liquid container a volume of said second body of air proportionate to the volume increase in the first body of air to displace the desired volume of liquid from the container, and venting both bodies of air to atmosphere after thermal expansion and injection into the container, respectively, to prepare for a subsequent dispensing operation.

6. The method of dispensing a desired volume of liquid from a body of such liquid confined in a container, characterized by confining a body of gas in a chamber having a movable wall dividing the chamber into two volume compartments of inversely proportional capacity, locating heating means in one of the compartments, adjusting the position of the movable wall to selectively vary the volume of the confined body of gas, thermally expanding the confined body of gas in said one compartment by said heating means to a predetermined volume and injecting into the container a volume of gas proportionate to the volume increase in the confined body of gas in said one compartment to displace the desired volume of liquid from the container.

7. A dispensing apparatus including a container for a body of liquid, an outlet from the container, and an inlet for supplying air under pressure to the container, characterized by a pressure vessel having a movable wall extending across the interior thereof dividing the vessel into first and second air chambers, an outlet from the second chamber connected to the container inlet, a heating element located in the first chamber for thermally expanding the body of air in the first chamber, expansion of air in the first chamber causing the movable wall to displace a portion of the air of the second chamber through the container inlet to dispense a portion of the body of liquid from the container through the outlet thereof, and valve openings venting the chamber to atmosphere following each dispensing of liquid from the container.

8. A dispensing apparatus including a container for a body of liquid, an outlet from the container, and an inlet for supplying air under pressure to the container, characterized by a pressure vessel having a movable wall therein dividing the vessel into first and second air chambers, an outlet from the second chamber connected to the container inlet, a heating element for thermally expanding the body of air in the first chamber, said heating element comprising a frame having a plurality of spaced support elements and a resistance element wrapped around said support elements so as to have its major length surrounded by a body of air in the first chamber, expansion of air in the first chamber causing the movable wall to displace a portion of the air from the second chamber through the container inlet to dispense a portion of the body of liquid from the container through the outlet thereof.

9. A dispensing apparatus including a container for a body of liquid, an outlet from the container, and an inlet for supplying air under pressure to the container, characterized by a pressure vessel having a movable wall dividing the interior thereof into first and second air chambers, an outlet from the second chamber connected to the container inlet, a heating element located in the first chamber for thermally expanding the body of air in the first chamber, expansion of air in the first chamber causing the movable wall to displace a portion of the air from the second chamber through the container inlet to dispense a portion of the body of liquid from the container through the outlet thereof.

10. The method of dispensing a desired volume of liquid from a body of such liquid confined in a container, characterized by confining a body of air in a chamber of fixed volume, providing a movable wall in said chamber dividing the body of air into first and second bodies of air in air pressure relationship, locating heating means in said first body of air, maintaining the second body of confined air in pressure relationship with the body of liquid in said liquid container, thermally expanding said first body of air by said heating means to a predetermined volume causing displacement of said second body of air with resultant displacement of a volume of liquid from the container proportionate to the volume increase in the first body of air.

11. The method of dispensing a desired volume of liquid from a body of such liquid confined in a container, characterized by confining a body of air in a chamber of fixed volume, providing a movable wall in said chamber dividing the body of air into first and second bodies of air in air pressure relationship, locating heating means in said first body of air, establishing communication between the second body of confined air and said liquid container, thermally expanding said first body of air by said heating means to an adjustable predetermined volume causing displacement of said second body of air with resultant displacement of a volume of liquid from the container proportionate to the volume increase in the first body of air.

12. The method of dispensing a desired volume of liquid from a body of such liquid confined in a container, characterized by confining a body of air in a chamber of fixed volume, providing a movable wall in said chamber dividing the body of air into first and second bodies of air in air pressure relationship, locating heating means in said first body of air, establishing communication between the second body of confined air and said liquid container, thermally expanding said first body of air by said heating means to a predetermined volume causing displacement of said second body of air with resultant displacement of a volume of liquid from the container proportionate to the volume increase in the first body of air, and venting both bodies of confined air to atmosphere after thermal expansion of the first body of air to prepare for a subsequent dispensing operation.

References Cited in the file of this patent
UNITED STATES PATENTS

| | | |
|---|---|---|
| 776,106 | Buerrier | Nov. 29, 1904 |
| 829,810 | Swan | Aug. 28, 1906 |
| 1,224,313 | Nathan | May 1, 1917 |
| 1,283,071 | Cooper | Oct. 29, 1918 |
| 1,493,898 | Ross | May 13, 1924 |
| 2,065,128 | Eisinger | Dec. 22, 1936 |
| 2,080,576 | Persons | May 18, 1937 |
| 2,392,087 | Griffith | Jan. 1, 1946 |
| 2,547,974 | Richards | Apr. 10, 1951 |
| 2,576,747 | Bryant | Nov. 27, 1951 |
| 2,583,688 | Dobkin | Jan. 29, 1952 |
| 2,599,038 | Aske | June 3, 1952 |
| 2,612,034 | Constantine | Sept. 30, 1952 |
| 2,628,744 | Mowbray | Feb. 17, 1953 |
| 2,659,799 | Ireland | Nov. 17, 1953 |
| 2,740,626 | Hall | Apr. 3, 1956 |
| 2,798,440 | Hall | July 9, 1957 |
| 2,853,208 | Paulding | Sept. 23, 1958 |
| 2,859,700 | Olson | Nov. 11, 1958 |
| 2,867,224 | Martiniak et al. | Jan. 6, 1959 |
| 2,867,974 | Wenander | Jan. 13, 1959 |
| 2,869,760 | Karlen et al. | Jan. 20, 1959 |
| 2,914,217 | Warhus | Nov. 24, 1959 |